Figure 1:
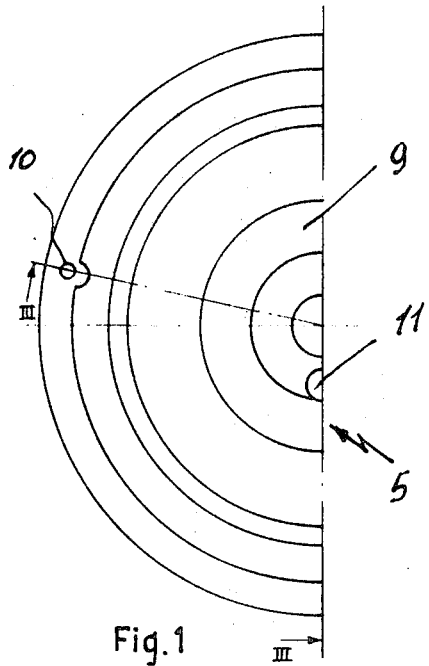

United States Patent
Bertinetti et al.

[15] 3,651,705
[45] Mar. 28, 1972

[54] GEARS FOR TOOTHED BELT DRIVES, PARTICULARLY FOR MOTORS FOR AUTOMOTIVE VEHICLES, MADE OF SYNTHETIC MATERIAL

[72] Inventors: Emilio Alberto Bertinetti; Aurelio Lampredi, both of Turin, Italy

[73] Assignees: Fiat S.p.A.; Cigala & Bertinetti S.a.S., Turin, Italy

[22] Filed: Oct. 14, 1970

[21] Appl. No.: 80,729

[52] U.S. Cl. ............................................74/243 R, 74/446
[51] Int. Cl. ...................................F16h 55/30, F16h 55/12
[58] Field of Search................................74/243 R, 446, 439

[56] References Cited

UNITED STATES PATENTS

| 2,759,368 | 8/1956 | Kitto | 74/446 |
| 3,200,665 | 8/1965 | Wells | 74/446 |
| 3,272,027 | 9/1966 | Wayman | 74/243 R |

*Primary Examiner*—Leonard H. Gerin
*Attorney*—Clario Ceccon

[57] ABSTRACT

A synthetic plastic gear adapted for use with a toothed belt drive such as found in the motor of an automotive vehicle is provided with a co-molded central bushing and a web connecting the bushing and the teeth of the gear. The web is formed in two different and parallel planes. A skirt, in the form of a radially extending circular flange, may be formed on one face of the gear.

2 Claims, 5 Drawing Figures

GEARS FOR TOOTHED BELT DRIVES, PARTICULARLY FOR MOTORS FOR AUTOMOTIVE VEHICLES, MADE OF SYNTHETIC MATERIAL

In drives for motors for automotive vehicles it is known at present to use the toothed belts cooperating with corresponding metals gears instead of the conventional gearings comprising chains and gears for the chains.

The use of toothed belts and corresponding metal gears was suggested by a plurality of technical practical considerations of the ground of which some characteristic disadvantages of chain drives are eliminated.

One of the main disadvantages of said chain drives is due to the fact that the articulations of the chain links are subject to a relatively rapid wear which requires frequent adjustments of the length of the chain. Another disadvantage of the chain drives originates from the fact that because of the high speed of the motors and consequently high rotational speed of the chains, which latter in some portions thereof are of considerable lengths, the stresses exerted on these portions become considerable because of the centrifugal force to which such chain portions are subjected.

With the use of the drives comprising toothed belts and corresponding metal gears most of the disadvantages mentioned above are eliminated though from certain points of view the new type of drive is be less economical than the conventional types. In fact, the structural difference existing between the metal skirt of the gear and the band of the belt of synthetic material, causes rapid wear of the belt and therefore required the frequent necessity of substituting the same. In order to obviate this big disadvantage the present invention has as an object to provide, as a new industrial product, gears molded of synthetic material for drives for endothermic motors, especially motors for automotive vehicles, characterized in that they are provided with a working skirt respectively to the toothed belt, said skirt having such characteristics of hardness as to reduce substantially the wear of the band of the involuting belt. The reduction of this wear, as it results from experiments which have been made, is raised to values which are nearly equal to the wear of the skirt of the gears, i.e., practically negligible values as referred to the life of the gearings relative to the drive.

A further feature of the gears according to the invention consists in that each gear with toothed skirt which is arranged to engage the corresponding toothed band on the belt, comprises a central metal bushing provided with suitable locking means in respect of the corresponding shaft on which it has to be mounted; said bushing being formed integrally with the body of the gear, in a central position in respect thereto, during the molding process of the body of the gear.

Figure 2:
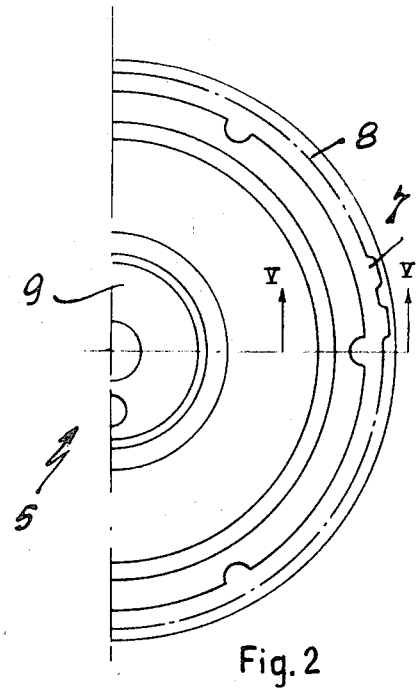
Figure 3:
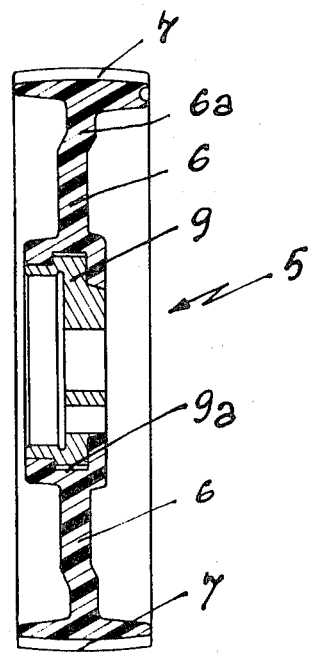
Figure 4:
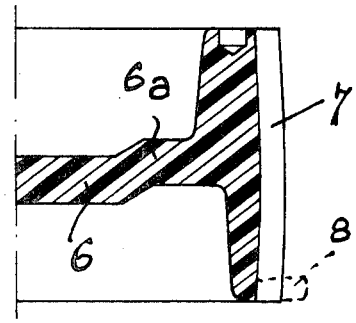
Figure 5:
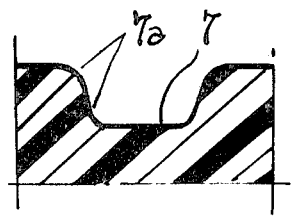

More ample and clear features of the gears referred to will become apparent from the disclosure hereinafter with reference to the annexed drawing, which is being submitted by way of example only, wherein:

FIG. 1 is a diagrammatic rear view of half of a gear according to the invention, FIG. 2 is a view similar to FIG. 1, showing the front face of the same gear, FIG. 3 is a sectional view taken along line III—III of FIG. 1, FIG. 4 is an enlarged sectional view showing a detail from FIG. 3, FIG. 5 is an enlarged view taken along line V—V of FIG. 2 showing the profile of the recess between consecutive teeth of the gear skirt.

As shown in FIGS. 1, 3 and 4, the gear or toothed pulley, whichever its diameter may be, molded of suitable synthetic material, has a substantial T-shaped diametral section 6 and comprises a perimetral toothed skirt 7 having a tooth profile capable to cooperate with a corresponding driving belt known in itself.

The toothed band 7 may be formed in such a manner as to have the teeth extending on the whole amplitude of the band from one side to the other, or, as shown in FIG. 2, the teeth to finish in longitudinal depth so as to form a retainer flange 8 suitably protruding over the depth of the teeth 7.

In any case, whichever the configuration of the toothed band may be, each gear or pulley 5 is centrally provided with a metal hub 9 having a notched perimetral skirt 9a, incorporated in the body 6 during the molding process and therefore solidly engaged with said body.

As shown in FIG. 1, each gear is provided during the molding process with the necessary marks 10 for the timing adjustment, whereas its central hub 9 is provided with the spline 11 for the key or pin.

As shown in FIG. 5, the profile of teeth 7 includes edges 7a suitably rounded and shaped in such a manner as to fit with the teeth of the corresponding driving belt.

As shown in FIG. 3, the cross-profile of each gear or toothed pulley has the central disk 6 molded in such a manner as to obtain two ring areas 6, 6a, which are formed in a single body and moderately dissymmetrical respective to the vertical plane in which they lie, in order to oppose the greatest resistance against the stresses to which the pulleys are subject during operation.

The use of the toothed pulleys or gears in question, molded from suitable synthetic material, particularly for the gearings of toothed belt drives for motors of automotive vehicles, in addition to the considerable reduction of the cost of the drives as compared with the same devices using metal gears, has the advantage of reducing to a minimum the wear of the toothed belt and consequently the advantage of a longer life of the mechanical assembly.

It is obvious that the object of the present invention, although specifically referred to herein in connection with drives having a toothed belt, particularly for motors of automotive vehicles, may be used advantageously in any analogous application out of the field of motors for automotive vehicles.

We claim:

1. A composite gear for use with a toothed belt drive, particularly for motor drive shafts for automotive vehicles, said gear comprising a toothed periphery, an integrally molded central portion having a bore with an annular groove therein, an integrally molded wall for connecting said central portion of said toothed periphery, an integrally molded skirt extended radially from the toothed periphery of said gear on one face thereof and a metallic hub having a radially extending flange positioned within the annular groove of said central portion, said hub having a concentric bore adapted to be mounted on the motor drive shaft.

2. The gear in accordance with claim 1, wherein said web is formed in different and parallel planes.

* * * * *